Jan. 18, 1927.  1,615,060
P. S. ARNOLD
INDICATING MICROMETER
Filed May 15, 1920  3 Sheets-Sheet 1

Inventor
PHILIP S. ARNOLD
By Charles E. Wisner
Attorney

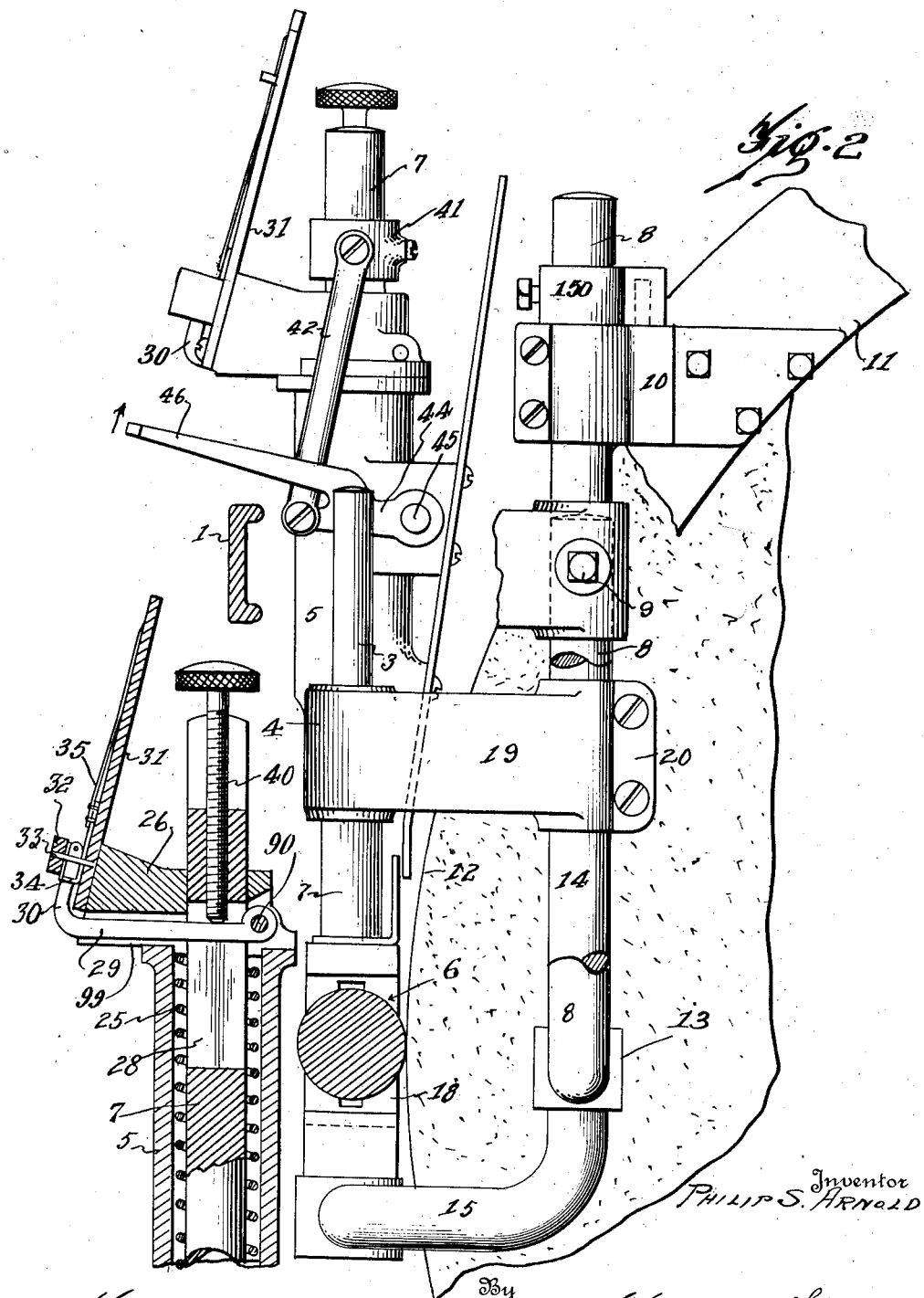

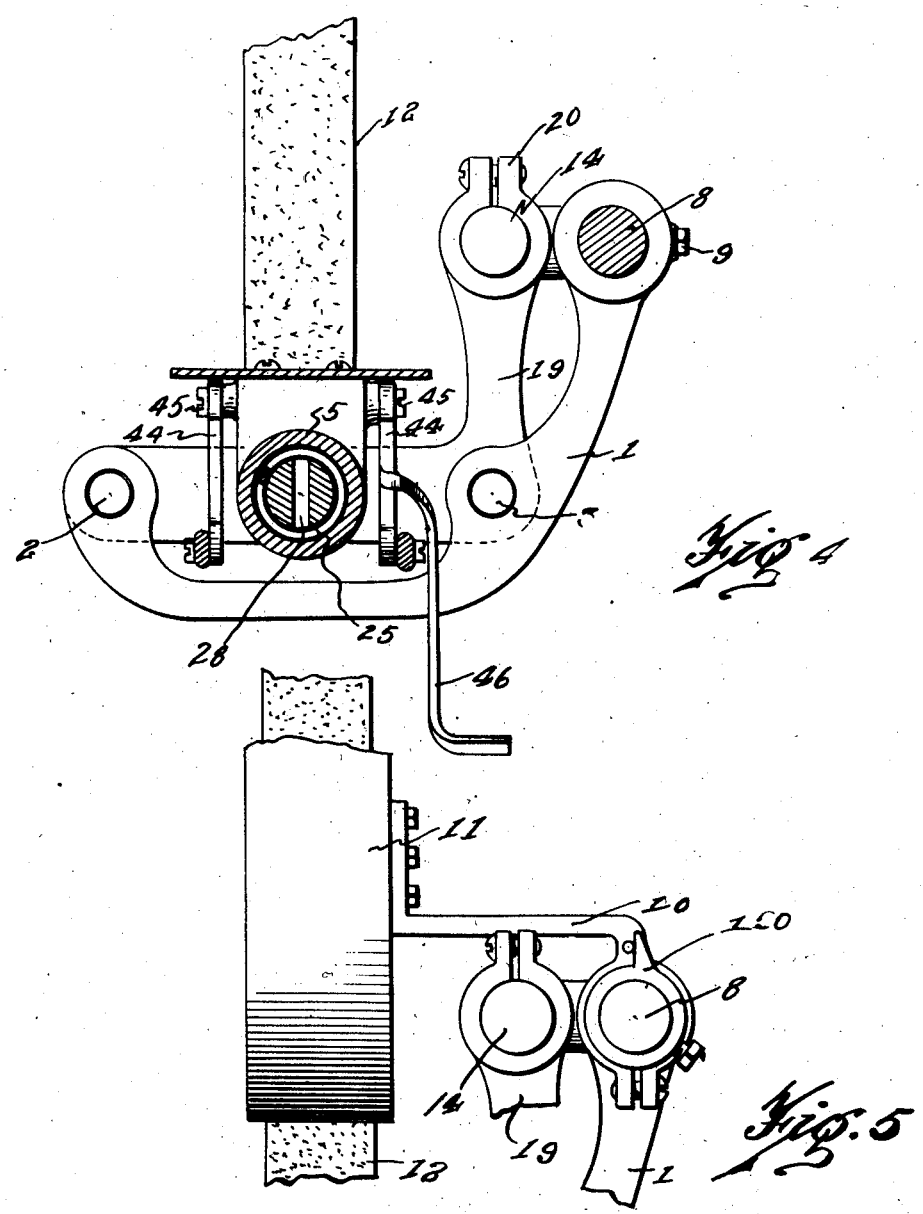

Patented Jan. 18, 1927.

1,615,060

UNITED STATES PATENT OFFICE.

PHILIP S. ARNOLD, OF DETROIT, MICHIGAN, ASSIGNOR OF ONE-FIFTH TO CHARLES E. WISNER, OF DETROIT, MICHIGAN.

INDICATING MICROMETER.

Application filed May 15, 1920. Serial No. 381,543.

This invention relates to indicating micrometers, and its object is to provide a micrometer or caliper for use in conjunction with grinding machines in grinding cylindrical objects of a construction and character to indicate when the object operated upon has been ground to the desired size. Heretofore, in grinding various articles, as for instance, a shaft, it is necessary for the operator to caliper the object being ground several times during the grinding operation to determine when the article has been ground to size and with some types of calipering operation, the grinding operation has to be stopped to permit of the calipering of the work. Also with snap gauges which are sometimes used or this purpose capable of being placed on he article during the grinding thereof the caliper points bind on the article and the gauge is forcibly drawn from the operator's hand and destroyed. The caliper points of a snap gauge soon wear and such gauges soon become inaccurate. To secure accuracy by use of such previous devices much time is consumed and necessitates the stopping of the machine during the careful calipering of the work and considerable loss is occasioned through the article being finished slightly over or under size.

This invention seeks to obviate these difficulties to eliminate the loss of time and to secure much greater accuracy in the grinding of an object and this is secured through an arrangement of the parts having an indicator over which a pointer passes, the movement of the pointer being greatly magnified relative to the movement of the calipering shoes or points thus enabling much greater accuracy to be secured both by reason of visible indication as to when the article is approaching the desired size and also by reason of the exaggerated movement of the pointer which makes the condition of the work plainly visible.

Another object of this invention is to provide an indicating micrometer of the general character stated adapted to be mounted on framework of a grinding wheel provided with calipering points or shoes riding the work during the grinding operation and providing in conjunction therewith an indicator visibly indicating the extent of movement of the shoes permitted by reduction of the diameter of the work by the grinding wheel. Another object of the invention is to provide a micrometer of the character stated adapted to be adjusted for use upon work of various sizes and that further is of a construction permitting the calipering points or shoes to be separated for the removal of the finished work and introduction of new work therebetween, in the construction of the indicator and mechanism through which the indicator is operated and in the arrangement of the parts permitting the shoes and clamping device to in a sense "float" on the work although securely positioned by the supporting framework. These objects and several novel features of the invention are hereinafter more fully described and claimed, and the preferred form of construction embodying my invention is shown in the accompanying drawings in which—

Fig. 2 is a side elevation thereof showing the relationship of the grinding wheel to the calibrating device.

Fig. 3 is a vertical section through the indicator and upper end of the shaft carrying one of the shoes.

Fig. 4 is a section taken on line 4—4 of Fig. 1 showing the mounting of the pointer.

Fig. 5 is a plan view of the supporting bracket for the gauge.

Figure 1:
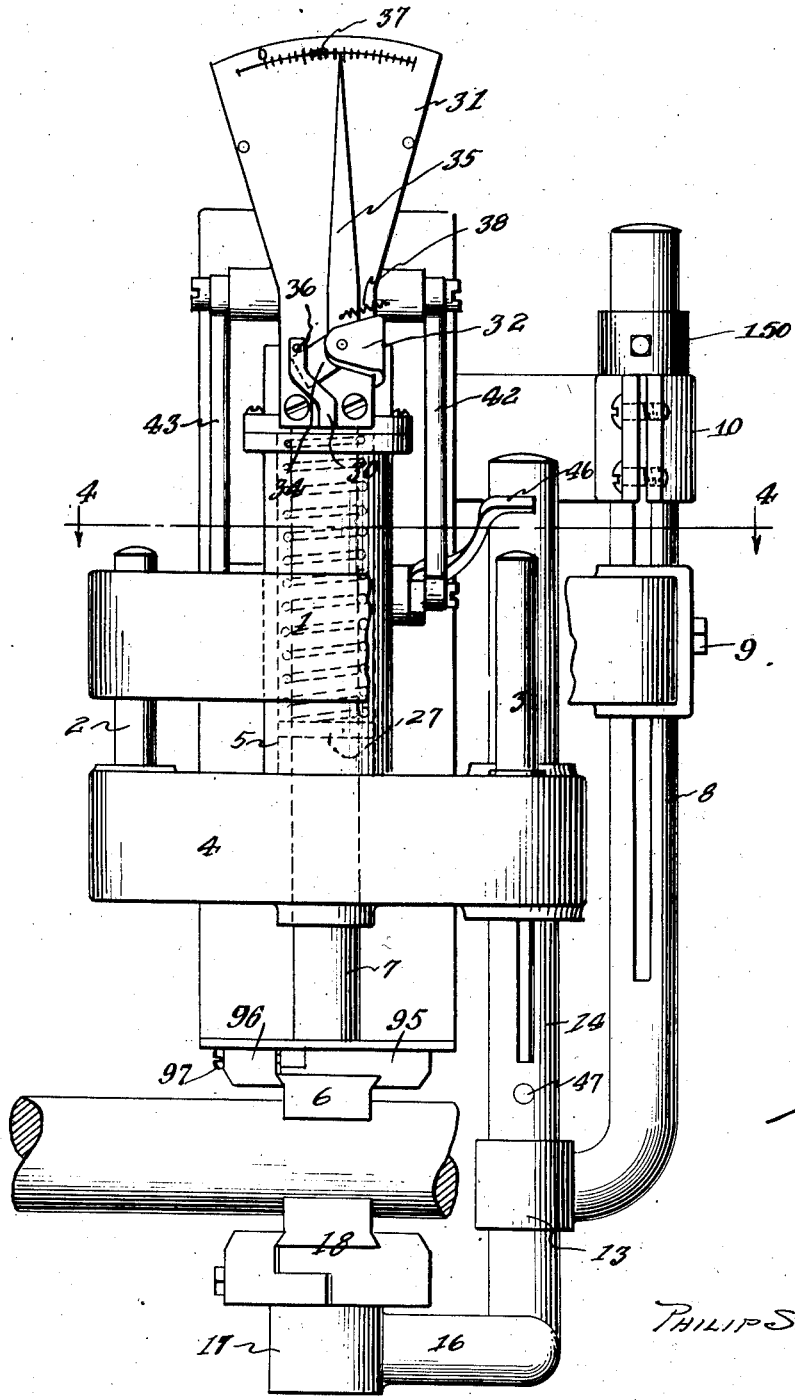
Fig. 1 is a front elevation of the calipering device embodying my invention.

The device consists of a stationary frame member 1 which is somewhat U-shaped in form, the outer end thereof having a vertical aperture for a pin 2 and intermediate its ends is provided an aperture for the pin 3. The pins are provided on the head 4 of a movable frame member 5 carrying a shoe or calipering point 6 and rod 7 thereof. The opposite end of the stationary frame member 1 in which the pins 2 and 3 ride is fixedly supported on a vertical supporting rod 8, the end of the frame being provided with an aperture for the said rod and also being provided with a set screw 9 by means of which the frame member 1 may be adjusted in its vertical position on the rod. This rod at the upper end is secured to a bracket 10 in which the rod is clamped and which bracket is supported on a shield 11 or convenient portion of the framework of the grinding wheel indicated at 12 in Fig. 2.

Thus the rod 8 and the frame member 1 are held in fixed position and the construction provides for a vertical adjustment of the frame 1 on the rod and adjustment of the rod and fixed frame thereon in the bracket 10 thereby providing adjustment for operation on work of various diameters. The lower end 13 of the rod has an aperture therein in which rides a vertical rod 14, the diameter of which is somewhat less than the diameter of the aperture therefor in the portion 13. This permits a considerable latitude of movement of the rod 14 relative to the rod 8. The rods 8 and 14 are practically in the same plane and are positioned at the rear of the movable frame 5 as will be understood from Fig. 2. The rod 14 at the bottom is outwardly bent as indicated at 15 and then laterally, as shown at 16, positioning the end 17 thereof and the shoe 18 thereon vertically beneath the rod 7 and shoe 6. The shoe 18 provides the lower caliper member and the shoe 6 the upper caliper member and these shoes may be of any approved form preferably being as here shown of a type that is removable from the holder. To permit removal of the shoes, the holders in each case are preferably made of two parts, a stationary part 95 and a movable part 96 connected therewith by means of a screw 97. These stationary and movable parts provide a clamp engaging over the base of the shoe. The structural features of the holder, however, are not material to this invention but, by providing means permitting of their ready removal, shoes of different sizes may be readily utilized and worn shoes easily removed and new ones inserted.

The head 4 of the movable frame 5 has an inwardly extending portion 19 terminating with a split bearing 20 in which is clamped the rod 14. The rod 14 is thus vertically adjustable in the clamp 20 and this adjustment and the adjustments of the frame member 1 and rod 8 in its bracket permits of the setting of the parts to operate on work of various diameters as hereinbefore stated.

The rod 7 carrying the shoe 6 is reciprocable in the frame 5 and about the rod in this tubular frame member 5 is a coiled compression spring 25 which engages against the indicator block 26 attached to the frame member at the upper end and against a shoulder 27 formed on the rod as indicated by dotted lines in Fig. 1. This spring tends to force the shoe 6 downward in contact with the work and, as this spring is carried in the frame 5 abutting against a fixed portion thereof which frame also carries the head 4 to which the shoe 18 is fixedly attached by means of the rod 14, the shoe 18 is therefore drawn upward and the shoe 6 pressed downward into engagement with opposite sides of the work by this one spring. As the frame 5 and head 4 thereon float in the frame 1 there is plenty of latitude of movement allowed to permit the two parts supporting the shoes to enable the same to ride the work and to be held in engagement therewith even though there be some slight variations in the position relative to the fixed frame part of the device. The rods 2 and 3 are simply guide rods for the movable frame and loosely fit the apertures in the frame 1 provided therefor.

As may be observed in Fig. 3, the rod 7 adjacent the upper end of the tubular frame 5 is provided with a slot 28. A lever 29 is pivotally mounted at 90 in the block 26 and extends through a way or slot 99 provided in the block 26 and the slot 28 in the rod 7 and is upwardly bent as indicated at 30 in Fig. 3 and outwardly bent and provided at the end with a pin 36 as will be understood from Fig. 1. At the end of the block 26 over which the bent end 30 of the lever extends is secured a dial plate 31 which has an upwardly and outwardly bent lug 32 spaced from the face of the plate as will be understood from Figs. 1 and 3 and a pin 33 extends through the said lug 32 into the base of the plate and through the return bent end 34 of the pointer of a pointer member 35 as shown in Fig. 3. This return bent end 34, as will be understood from Fig. 1, extends at an angle to the body portion 35 of the pointer and is engaged by the pin 36 in the end 30 of the lever 29. The length of the body of the pointer is many times the length of this end 34 so that a slight movement of the lever 29 causes a considerably greater movement of the indicating end of the pointer. The upper end of the indicator plate has positioned thereon a line 37 preferably graduated and near one end is a zero mark as will be understood from Fig. 1. Normally the pointer 35 turns to the right from the position shown in Fig. 1 under influence of a spring 38 attached to the pointer and to a stationary part of the dial support.

The pointer is operated by means of the screw 40 extending longitudinally into the end of the rod 7 and projecting into the slot 28 through which the lever 29 passes. Normally, when the shoes are placed on the work, the end of this pin 40 is above the lever 29 some little distance and as the work is ground and the shoe 6 enabled to move downward under the influence of the spring 25, the rod 7 is moved downward in the tubular frame 5 eventually bringing the point of the screw 40 into contact with the lever depressing the same and moving the end 30 downward. The pin 36 engages over the end 34 of the pointer member and on downward movement of the lever 29 causes the pointer 35 to traverse the line 37 to the left of position shown in Fig. 1. It is to be noted that this lever comes into operation as the work approaches the predetermined diameter. As the pointer reaches the zero mark the work will have attained predetermined size and the grinding wheel may thereupon be withdrawn from the work in the usual manner not here shown. There is thus given a visible indication of the condition of the work, the indicator being so positioned as to be practically within the line of vision of the operator who may at all times observe how closely the work is approaching its predetermined diameter and to cause cessation of operation of the grinding machine the instant the pointer reaches the zero indication Upon cessation of operation of the grinding machine, it is necessary to withdraw the shoes from contact with the work. For this purpose I have provided on the rod 7 a collar 41 to which on opposite sides is attached a link 42 and 43 each of which is pivotally connected with the levers 44 on opposite sides of the frame member 5. These levers 44 are both pivotally supported at 45 on opposite sides of the frame and one of the levers, preferably that upon the right hand side of the device as shown in Figs. 1 and 2, has a hand lever 46 extending outwardly toward the front of the machine in position readily accessible by the operator and, by moving this lever upward in the direction shown by the arrow in Fig. 2, the rod 7 and the shoe 6 are moved upward withdrawing the shoe from engagement with the work. This also permits the shoe 18 to drop away from the work on the lower side. In fact the shoe 6 would continue to remain on the work or the shoe 18 only drop away from the work. To obviate this I have provided a pin 47 extending through the rod 14 with which the shoe 18 is connected. The pin 47 normally is above the end 13 of the supporting rod 8. This pin limits the distance which the shoe 18 may drop and, after the shoe 18 drops its permitted distance, the shoe 6 is thereupon drawn upward to the full extent by the lever 46. The calipers are thus opened to an extent sufficient to permit removal of the finished piece and introduction of a new piece of work. The shoes 6 and 18 may be held in open position after a new piece of work has been introduced and need not be brought into engagement with the work until it is approaching its desired size whereupon, by bringing the lever 46 back to the position shown in Fig. 2, the shoes are again brought into contact with opposite sides of the work. As soon as the pin 36 comes into contact with the end 34 of the pointer, continued reduction of the diameter of the work will cause the pointer 35 to traverse the indicator.

The caliper frame 5 and head 4 thereof are supported directly on the vertical rod 14 and may be adjusted in position vertically of the said rod by means of the split bearing 20 to vary the spacing of the shoes 6 and 18. The rod is slidable in the bearing 13 and this rod 14 at the end 17 thereof carries the lower shoe 18, the upper shoe being carried on the rod 7 vertically movable in the frame or casing 5 of the head 4. By thus rigidly securing the frame 5 and head 4 on the rod 14, which rod is vertically movable in the bearing 13 and with the spring 25 tending to force the shoe 6 downward, the shoes and supporting frame may "float" with the work.

It is to be noted that the screw 40 is adjustable in the rod 7 so that the machine on being first set up to do a particular piece of work may be set accurately by gauging the work by the usual method of use of a hand caliper to secure a very accurate reading and the screw 40 accurately set. Thereafter, in the continued operation upon the different pieces of the same character no further adjustment is required except to take up wear for which purpose the work should occasionally be calipered by hand to verify the accuracy of the device. There is thus secured a great saving of time in the cost of production especially where a great number of pieces of the same character require the same general grinding operation. The individual pieces are set into the grinding machine, the machine operated until the pointer indicates zero whereupon the finished part is removed as hereinbefore described and a new part introduced and partially ground and the calipers then set to ride the work during the remaining grinding operation.

I have indicated this apparatus as being carried on a part 11 of the framework which moves with the grinding wheel so that the caliper members 6 and 18 are riding the surface of the work contacted by the grinding wheel. Excellent results are secured where the grinding wheel is moved longitudinally of the work as the micrometer or caliper is carried with the grinding wheel. Also, in case the work is moved across the face of the grinding wheel parallel with its axis of rotation the device is equally efficient in operation. By the use of this device therefore the continual stopping of the grinding operation to permit the work to be calipered is avoided and, if the operator is observant of the indicator, all pieces may be finished to an exact size avoiding waste caused by over or under-sized parts. Preferably I provide an adjustable stop device 150 on the upper end of the shaft or rod 8 which limits the extent to which the caliper frame may be turned in one direction about the axis of the rod 8. This stop enables the shoes to be positioned correctly relative to the axis of the work. The device is also comparatively simple in construction and is of a character adapted to be attached to grinding machines of various types and when attached to any of the ordinary grinding machines now on the market makes the machine practically automatic in operation.

Having thus fully described my invention, what I claim and desire to secure by Letters Patent of the United States is—

1. An indicating micrometer for use with grinding machines comprising the combination with means for grinding a piece of work to reduce the diameter thereof, of a calipering device having two parts for engaging diametrically opposite sides of the work, means for maintaining the two parts in yieldable contact with the work, means for causing the shoes to move on a straight line passing through the axis of the work as the diameter thereof is reduced, an indicator including a line having graduations thereon and a zero indication, a pointer adapted to traverse the graduated line, and means for moving the pointer operable through movement of the said two parts toward each other.

2. In an indicating micrometer adapted for use on a piece of work being reduced in diameter, a shoe riding on the surface of the work, said shoe having an arcuate face the radius of which is practically that of the finished work, yieldable means for causing movement thereof of the shoe in a straight line passing through the center of rotation of the work while being reduced in diameter, an indicator having a graduated line thereon and a zero indication, a pointer adapted to traverse the said line, a spring tending to move the pointer away from the zero indication, and means controlled by movement of the shoe through reduction in the diameter of the work causing the pointer to move toward the zero indication.

3. An indicating micrometer for gauging the diameter of a piece of work during the time it is being reduced in diameter comprising a pair of shoes adapted to engage diametrically opposite sides of the work during its reduction in diameter, yieldable means continuously holding the shoes in engagement with the work during its reduction of diameter, means for maintaining the shoes in contact with diametrically opposite sides of the work during the reduced operation, an indicator having a graduated line thereon including a zero point, a spring tending to move the pointer away from the zero point, and means operated by movement of the shoes toward each other for causing the pointer to move toward the zero indication.

4. In an indicating instrument adapted to measure a piece of work while being reduced in diameter, means for contacting the work at two diametrically opposite points, a spring for moving the shoes toward each other on a straight line passing through the axis of the work, an indicator having graduations including a zero point and a pointer member adjustable relative to said zero point, and means for moving the indicator towards and away from the zero point in fixed relation to the increased or decreased distance between the points contacted.

5. An indicating micrometer for indicating the extent of reduction of diameter of a piece of work being operated upon, a pair of shoes continuously riding in contact with diametrically opposite sides of the work, a spring tending to cause the shoes to approach each other, an indicator having a zero indication, a pointer for the indicator, and means whereby movement of both shoes permitted by the reduction in diameter of the work causes movement of the pointer across the indicator toward the zero indication.

6. An indicating micrometer for use with grinding machines comprising in combination with the grinding wheel, of a calipering device having parts continuously riding in yieldable contact with diametrically opposite sides of the work, a frame member supporting the calipering parts, said frame being rigidly attached relative to the grinding wheel frame and the said parts being positioned on the surface of the work running in contact with the grinding wheel, an indicator having a graduated line and zero indication, a pointer adapted to traverse the line, and means actuated through movement of the caliper parts toward each other causing the pointer to move toward the zero indication.

7. An indicating micrometer for use with grinding machines comprising the combination with a grinding wheel, of a caliper device having parts riding in yieldable contact with diametrically opposite sides of the work, a rigid supporting frame, a movable frame having one of the said caliper parts attached thereto, the other of said caliper parts being movable in the frame member, a spring tending to move the said caliper member, an indicator rigidly attached to the said movable frame, the indicator having a line thereon and a zero indication, a pointer pivotally mounted on the indicator adapted to traverse the said line, a spring holding the pointer to one side of the zero mark, and means adapted on movement of the caliper parts toward each other during the reduction in diameter of the work to move the pointer toward the zero indication.

8. An indicating micrometer for use with grinding machines comprising the combination with the grinding wheel thereof, of a caliper device having parts riding in contact with diametrically opposite sides of the work, a rigidly supported frame, a frame movable relative thereto carrying the caliper parts, one of the caliper parts being attached to the movable frame, a rod for the other of the said caliper parts reciprocable in the movable frame, a spring tending to project the said part and holding both caliper parts in yieldable contact with the work, and an indicating device having a zero indication and giving a visible indication of the extent of the surface of the work removed in the grinding operation.

9. An indicating micrometer for use with grinding machines, comprising the combination with the grinding wheel thereof, of a caliper device having parts riding in contact with diametrically opposite sides of the work, a frame supporting the caliper devices, a spring tending to move the two caliper parts together, a rigid framework for the said caliper frame, the said caliper frame being movable in the rigid frame permitting the caliper parts to "float" on the work, an indicating device including a zero mark, and a pointer movable thereon as the caliper parts approach each other, the zero point indicating when the caliper parts have attained a predetermined distance apart.

10. An indicating micrometer for use with grinding machines comprising the combination with a grinding wheel, of a frame adapted to be rigidly supported relative to the wheel and capable of a vertical adjustment, a second frame adjustable relative to the first frame and fixed thereto, a caliper frame movable relative to the second frame carrying caliper parts adapted to engage opposite sides of the work, a spring tending to draw the caliper parts together, an indicator giving an indication of the movement of the parts toward each other, the said caliper parts and frame member being supported directly in front of the grinding wheel, the said first frame including a rod and a bracket clamping the said rod permitting the second frame and caliper frame to be turned to swing the caliper parts to one side of the wheel face, a stop member on a stationary part of the said rigidly supported frame, and an adjustable device including a part adapted to engage the stop when the parts are turned to operative position.

11. In an indicating micrometer for use with grinding machines, the combination with a grinding wheel, of a frame member movable with the grinding wheel longitudinally of the work, said member having a part mounted to turn about a vertical axis, a pair of caliper parts carried by the frame member adapted to ride in contact with diametrically opposite sides of the work, means yieldably holding the caliper parts in contact with the work, an indicator giving an indication of the extent of reduction of the diameter of the work by the grinding wheel, an adjustable element on the turnable part of the frame and a fixed element on the frame engaged thereby to limit the movement of the frame in one direction and thereby positioning the caliper parts in correct position to engage the work.

12. An indicating micrometer for use with grinding machines comprising the combination with a grinding wheel, of a frame member pivotally mounted to the frame of the grinding wheel at one side thereof, a caliper device comprising a frame provided with calipering parts for engaging the work, the frame and caliper parts being adapted to "float" in the pivotally mounted frame with the said parts directly forward of the grinding wheel face, the pivotal mounting of the frame permitting the caliper frame and parts to be turned away from the face of the wheel, an adjustable stop device adapted to be set to limit the turning of the caliper members in one direction and accurately position the same relative to the work whereby the said caliper parts are automatically positioned when turned to operative relation with the work.

13. An indicating micrometer for use with grinding machines comprising the combination with the grinding wheel, of a frame, a rod adapted to be releasably held in rigid relationship with the frame, said rod being adapted for vertical adjustment, a frame member detachably connected with the rod and adapted to be vertically adjusted thereon, a caliper frame supporting a pair of caliper parts, a spring tending to draw the points toward each other, the caliper frame and parts being freely movable vertically in the said frame member whereby the said parts may "float" on the work, means for setting the points to engage work of various diameters, and an indicator actuated by movement of the caliper parts giving a visible indication of the extent of movement of the caliper parts toward each other when in engagement with the work.

14. In an indicating micrometer, a caliper member, or shoe adapted to ride on the work, a rod connected therewith, a spring tending to move the rod, a frame on which the rod is movable, an indicator plate on the frame having a zero indication, a pointer member therefor, a lever pivoted to the frame and adapted to move the pointer, and adjustable means on the rod adapted to engage the lever and turn the pointer as the caliper member and rod move in one direction in the frame.

15. An indicating micrometer for indicating the extent of reduction of the diameter of a piece of work being operated on, a pair of shoes continuously riding in yieldable contact with diametrically opposite sides of the work, a spring tending to cause the shoes to approach each other, an indicator having a zero indication, a pointer for the indicator, means actuated by movement of the shoes toward each other tending to move the pointer over the indicator toward the zero mark, and means for adjusting the indicator actuating device to compensate for wear of the caliper parts.

16. An indicating micrometer for use with grinding machines comprising the combination with the grinding wheel, of a frame member supported adjacent thereto, a caliper frame supported thereby in movable relation with the frame member, a pair of caliper shoes, one of the shoes being rigidly attached to the caliper frame, the other of said shoes being movably mounted relative thereto, a spring supported in the frame and tending to move the movable shoe, the spring acting against the frame in one direction and against the shoe in opposite direction whereby the caliper parts are yieldably drawn together, an indicator member attached to the frame, a pointer movable thereover, and actuating means for the pointer operated by the movable shoe.

17. In an indicating instrument adapted to measure a piece of rotating work, measuring means including a contact member yieldably held in engagement with the surface of the work and mounted to move on a straight line passing through the axis of rotation of the work, an indicating pointer member associated with the measuring means adjustable relative to a zero point, said indicating pointer having movement towards or away from the zero point in fixed proportion to the movement of the contact member toward or from the axis of the rotating work.

18. In an indicating instrument, in combination with a machine having means for reducing the diameter of material said means being movable longitudinally of the axis of the material to uniformly reduce the diameter thereof from end to end, measuring means movable in fixed relation with the diameter reducing means during its operation, said measuring means including a member contacting the material, an indicator having a zero indication, a movable pointer associated therewith, and means interposed between the contacting member and the movable pointer to move the pointer toward the zero indication in fixed proportion to the reduction of the diameter of the material.

19. In an indicating instrument in combination with a machine having means for reducing the diameter of a piece of work held in position to be operated on, measuring means having points contacting diametrically opposite sides of the work being reduced, means yieldably holding the said points in contact with the work during its reduction, means causing the points to approach each other on said diametrical line of the work during its reduction, and a pointer member actuated through the combined movement of the measuring points relative to the axis of the work.

20. An indicating instrument for use on a piece of work being reduced in diameter consisting of measuring device having two members adapted to contact diametrically opposite sides of the work, a spring for causing the said members to contact the work and thus to approach each other as the work is reduced in diameter, means for holding said contact members on the said diametrical line during the reducing operation and a pointer actuated through movement of the said members by the spring.

21. In an indicating instrument in combination with a machine having means for reducing the thickness of a piece of material, a pair of shoes contacting opposite sides of the work, a frame in which the shoes are supported, an indicator associated with the shoes, means for supporting the shoes relative to the frame to move therein as a unit and to be moved relatively on a straight line passing through the work to be measured, means whereby reduction in the thickness of the material causes a change in the relative position of the shoes, and means whereby such change in relative position actuates the indicator.

22. In an indicating instrument in combination with means for reducing the diameter of a piece of rotating work, a pair of shoes adapted to contact diametrically opposite sides of the work and being movable toward or from each other on a straight line passing through the axis of rotation of the work a lever for moving the shoes away from the work, and an indicator caused to indicate the extent of reduction of the diameter of the work by movement of the shoes toward each other.

23. In an indicating instrument in combination with means for reducing the diameter of a piece of rotating work, a frame, a pair of shoes carried thereby, means for causing the shoes to contact diametrically opposite sides of the work, means for moving the shoes away from or toward each other on a straight line passing through the axis of the rotation of the work, yieldable means to cause the shoes to approach each other as the diameter of the work is reduced, and an indicator connected with the shoes and movable thereby as the shoes approach each other to indicate the extent of reduction of the diameter of the work.

In testimony whereof, I sign this specification.

PHILIP S. ARNOLD.